United States Patent
Kaufmann

(10) Patent No.: US 8,783,568 B2
(45) Date of Patent: Jul. 22, 2014

(54) TELESCOPIC SIGHT

(76) Inventor: Gerhard Kaufmann, Herrenberg (DE)

( * ) Notice: Subject to any disclaimer, the term of this patent is extended or adjusted under 35 U.S.C. 154(b) by 852 days.

(21) Appl. No.: 12/375,639

(22) PCT Filed: Jul. 30, 2007

(86) PCT No.: PCT/DE2007/001355
§ 371 (c)(1),
(2), (4) Date: Nov. 30, 2009

(87) PCT Pub. No.: WO2008/014775
PCT Pub. Date: Feb. 7, 2008

(65) Prior Publication Data
US 2011/0017824 A1    Jan. 27, 2011

(30) Foreign Application Priority Data
Aug. 1, 2006  (DE) .......................... 10 2006 035 777

(51) Int. Cl.
*G06F 19/00*   (2011.01)
*G06G 7/80*    (2006.01)

(52) U.S. Cl.
USPC ............... 235/404; 235/400; 42/111; 42/114; 42/119; 42/122; 42/130

(58) Field of Classification Search
USPC ......... 235/404, 400; 356/8; 42/119, 114, 142, 42/111, 141, 122, 130; 250/201.1, 234, 250/201.2, 201.3, 201.8, 216
See application file for complete search history.

(56) References Cited

U.S. PATENT DOCUMENTS

| | | | |
|---|---|---|---|
| 3,672,782 A | 6/1972 | Akin | |
| 3,994,597 A | 11/1976 | Calder et al. | |
| 4,531,052 A | 7/1985 | Moore | |
| 5,141,313 A | 8/1992 | Brun | |
| 5,389,774 A | 2/1995 | Gelman et al. | |
| 5,497,266 A * | 3/1996 | Owen | 359/353 |
| 6,583,862 B1 | 6/2003 | Perger | |
| 2002/0078618 A1* | 6/2002 | Gaber | 42/123 |
| 2005/0018041 A1 | 1/2005 | Towery et al. | |
| 2005/0021282 A1* | 1/2005 | Sammut et al. | 702/150 |
| 2005/0252062 A1 | 11/2005 | Scrogin et al. | |

(Continued)

FOREIGN PATENT DOCUMENTS

| | | |
|---|---|---|
| CH | 667 150 | 9/1988 |
| DE | 2 347 761 | 9/1973 |

(Continued)

*Primary Examiner* — Michael G Lee
*Assistant Examiner* — Tabitha Chedekel
(74) *Attorney, Agent, or Firm* — Frommer Lawrence & Haug LLP

(57) ABSTRACT

Telescopic sight, in particular for a handgun, comprising an optical lens system which is integrated in an essentially elongated outer tube which preferably has a circular cross section and can be fitted to the handgun or the like, which optical lens system is terminated by an eyepiece at an end facing the shooter's eye when the gun is being used, and by an objective at its opposite end, and has, between the eyepiece and the objective, at least one image plane lying in the optical beam path of light beams passing through the eyepiece and the objective, wherein a graticule structure lying in the beam path is arranged in the or at least one of the image planes, characterized in that the graticule structure comprises a virtual image of a graticule arranged outside the beam path, said virtual image being projected into the (respective) image plane.

20 Claims, 4 Drawing Sheets

(56) References Cited

U.S. PATENT DOCUMENTS

Figure 1:
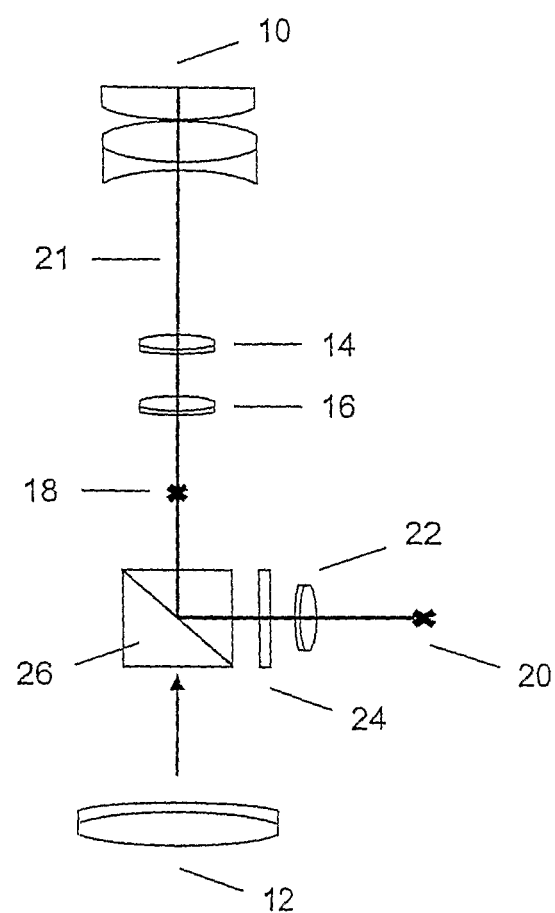

| | | | |
|---|---|---|---|
| 2005/0268521 A1 | 12/2005 | Cox et al. | |
| 2006/0010760 A1 | 1/2006 | Perkins et al. | |
| 2007/0137090 A1* | 6/2007 | Conescu | 42/142 |
| 2009/0266892 A1* | 10/2009 | Windauer et al. | 235/404 |

FOREIGN PATENT DOCUMENTS

| | | |
|---|---|---|
| DE | 39 33 042 A1 | 10/1989 |
| DE | 199 40 118 A1 | 8/1999 |
| DE | 199 49 800 A1 | 10/1999 |
| EP | 0 357 845 A1 | 9/1988 |
| EP | 0 357 845 | 3/1990 |
| EP | 1 467 237 B1 | 4/2004 |
| FR | 2 656 078 | 12/1989 |
| GB | 2 225 844 A | 6/1990 |
| WO | WO-93/20399 | 10/1993 |
| WO | WO 93/20399 | 10/1993 |
| WO | WO 2005/015285 | 2/2005 |
| WO | WO 2006/100666 | 9/2006 |

* cited by examiner

TELESCOPIC SIGHT

A telescopic sight, particularly for a handgun, with an optical lens system integrated in an attachable outer tube exhibiting an essentially elongated, preferably circular cross-section, on the handgun or some such, which is closed by an ocular at a forward end facing the eye of the marksman when using the weapon and at its opposite forward end by an objective and exhibits between the ocular and the objective at least one image plane lying in the optical ray path of the ocular and the objective which passes light rays through, in which a sight-graticule structure is disposed lying in the ray path on the, or on at least one of the, image planes.

With telescopic sights of known type, the sight graticule is "physically" placed on the image plane in order to fulfill measurement and targeting tasks. The sight graticule used in this way in prior art is either made of etched glass plates, which enable the representation of complex structures, or of fine wires, which admit of no complex structures. Because sight graticules are on the image plane of a telescopic sight, they are usually viewed by the marksman at a higher magnification and are for that reason particularly likely to have fouling and defects visible.

With known telescopic sights, the replacement of a sight graticule, for example, in the case of fouling or in the case of a defect, means an expensive operation which can only be performed by a specialist trained for this at an appropriately equipped workplace. Because the market demands, because of individual preferences, a large number of different sight graticules and therefore of telescopic sights, stocking is a costly logistic problem for the manufacturer as well as for the stocker, in which the difference between the many types of telescopic sight is only in a single, small, but complicated to install component, namely the sight graticule.

The invention is based on the problem of producing a telescopic sight of a generic type, in which the replacement of the sight graticule, preferably a variant of the same, can be performed in a simplified manner.

According to the invention, these problems in developing a generic telescopic sight are thereby resolved, by the fact that the sight-graticule structure consists of a virtual image projected on the (specific) image plane of a sight graticule disposed outside the path of the light rays.

At the same time, it can be provided that a beam splitter of the (specific) image plane is attached and is penetrated by light rays passing through from the ocular and the objective, and on which from outside the outer tube at least one sight graticule and a display unit exhibiting a projection device and the image of the (specific) sight graticule can be projected.

The invention also provides, if necessary, that the outer tube exhibits in the ray path between the display unit and the beam splitter a projection opening sealed closed by a transparent, dust- and waterproof window.

At the same time, it may also be provided that the beam splitter exhibits an optically translucent prism.

A further embodiment of the invention is characterized by the fact that the display unit exhibits a storage unit with a plurality of sight graticules as well as a selection device for selectively projecting at least one of the sight graticules onto the beam splitter(s).

The invention furthermore provides, if necessary, that the selection device and/or the storage unit is/are formed electronically.

According to the invention, it can also be provided that the display unit exhibits a variation device for changing the sight picture projected on the beam splitter.

A particular development of this embodiment provides that the variation device is formed electronically.

It can also be provided that the variation device is set up for zero-point adjustment of the telescopic sight.

At the same time, it can be provided that the variation device exhibits an electronic computer in connection with an electronic sight-graticule storage unit and a high-resolution graphics module.

The invention also provides, if necessary, that the variation device can be operated by means of a keying device attached directly to the telescopic sight or to the weapon or by remote control.

At the same time, it can also be provided that the ballistics, specific values, such as ammunition parameters, for the bullet being shot from the weapon, can be entered by means of the keying device into the variation device during range-finding.

A further embodiment of the invention is characterized by the fact that a target range-finder can be connected to the variation device.

The invention furthermore provides, if necessary, that the computer of the variation device is connected to a device found on the telescopic sight for parallax correction.

According to the invention, it can also be provided that the computer of the variation device is connected to an air-pressure meter.

A particular development of this embodiment provides that angle-measuring instrument is connected to the computer of the variation device, which essentially records all the inclination movements of the telescopic sight and delivers its data to the computer.

It can also be provided that side-tilting movements of the unit consisting of the weapon and the telescopic sight can be indicated to the marksman by the display device using the data from the correction device.

At the same time, it can be provided that the sight picture in relation to the deviation in the flight path of the bullet caused by side tilting can be corrected directly by the computer.

Finally, an embodiment of the invention also provides that the sight picture distinguishable for the marksman in the telescopic sight relative to the target through the computer can be corrected upward or downward by the computer while shooting.

The invention is based on the surprising knowledge that it succeeds in resolving the previously mentioned problems to be resolved for known telescopic sights due to the "physical" structure of the sight graticule disposed in the ray path, by the fact that instead of an actual sight graticule on an image plane of the telescopic sight, only the image of an "intrinsic" sight graticule found outside of the ray path or of the outer tube of the telescopic sight is disposed there. This means that the intrinsic sight graticule is not located inside the optical ray path of the telescopic sight, but lies outside and is merely projected onto the image plane of the telescopic sight by an optical projection system.

The advantage over prior art consists of the fact that the user and thus the customer himself is in a position to interchange the sight graticules. This can be done by replacing the entire display unit. It can also be provided that an appropriate number of sight graticules is stored electronically, whereby a selection can then be made from these sights by means of a keyboard or electronic control unit.

The glass window separating the projection unit and the telescopic-sight optics is made water- and dustproof Thus, neither moisture nor dust can penetrate into the optical system of the telescopic sight. Because the sight graticule can be easily cleaned or replaced as needed, the expense of servicing by the manufacturer, for example maintenance operations, is considerably reduced. The typical magnification of the telescopic sight can be substantially increased. The logistic costs for the manufacturer and the stocker are thus considerably decreased.

With a telescopic sight according to the invention, zero-point adjustment can be applied by adjusting the tube containing the lens-reversal system and is done by simply removing the sight graticule itself, which lies outside the outer tube, one of the mirrors, or the projection-lens system. The conventional elevations, and side adjustment posts, are no longer required, as a result of which the assembly possibilities of the telescopic sight according to the invention are also considerably improved on the weapon.

If the sight picture is produced by a high-resolution graphics module connected to a computer and a storage unit, all the required adjustments can be done in advance, including range-finding of the weapon by this module. There is no mechanical adjustment whatsoever for this, such as removal of the reversal-lens system, required up to now.

If the sight picture is produced by a high-resolution graphic module connected to a computer and a storage unit, all the shapes and colors stored from the sight graticule according to the assembly requirements of the marksman can be called up or even designed and executed by the marksman himself according to his individual desires.

Through the graphics modules depicted, also illuminated if necessary, for example, sighting components can be switched on for each sighting event. This can be done using a pushbutton on the telescopic sight itself or by a button communicating with the telescopic sight via cable or a Bluetooth link, for instance. These are by preference positioned ergonomically favorably on the weapon, preferably on the neck of the stock or outside on the rear portion of the trigger guard facing the marksman. If the button is mounted outside on the rear portion of the trigger guard, then it can be easily operated by the marksman's shooting hand.

During range-finding, those parameters of the ammunition being fired are entered which specify the external flight path (ballistics) of the bullet, preferably by means of a keyboard or control unit on the telescopic sight or an input display unit communicating with the telescopic sight over a Bluetooth link.

Immediately before each firing, the firing range can be entered, preferably either manually by means of the keyboard or control unit available on the telescopic sight or by an internal or external laser range-finder by means of a Bluetooth link, for instance. The computer calculates and corrects using these data by adjusting the data entered for the sight picture relative to the target.

A device found on the telescopic sight for parallax correction is preferably connected to the computer. The computer is thus in a position to correlate the range entered with the ballistics correction.

The telescopic sight can optionally be supplemented by a miniaturized air-pressure measuring instrument, which delivers its data to the computer of the display unit, which can consequently correct the sight picture as a function of air pressure relative to the target.

The telescopic sight can be combined with an angle-measuring instrument which records all the inclination movements of the telescopic sight and delivers its data to the computer. All the inclination movements, the so-called tilting of the unit consisting of the weapon and telescopic sight, can be indicated at once to the marksman on the display, based on the data from the correction device. Alternatively to this, the sight graticule can also be corrected immediately by the computer with respect to deviation caused by side tilting of the bullet's flight path. While shooting upward or downward, the sight position is preferably corrected on principle by the computer relative to the target.

Further features and advantages of the invention result from the following description and are clarified in the embodiment examples using the schematic drawings individually.

Figure 2:
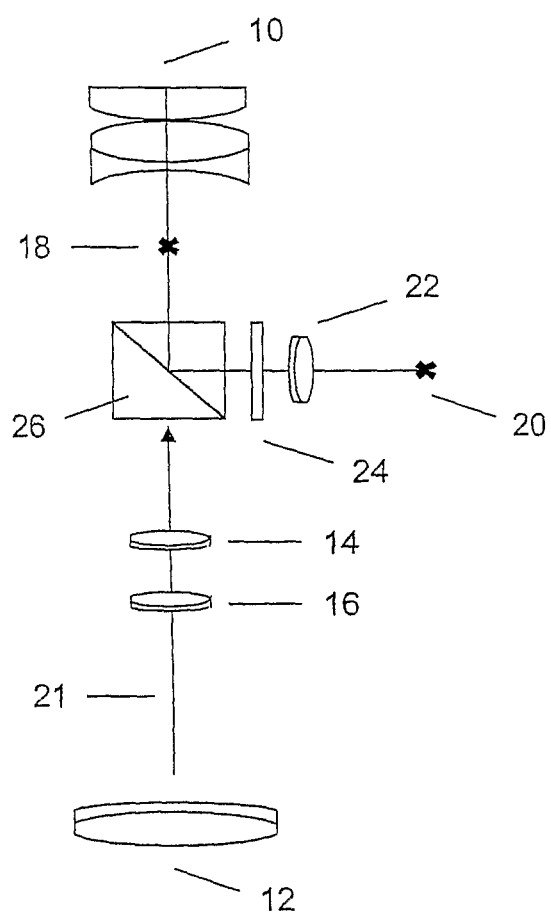
Figure 3:
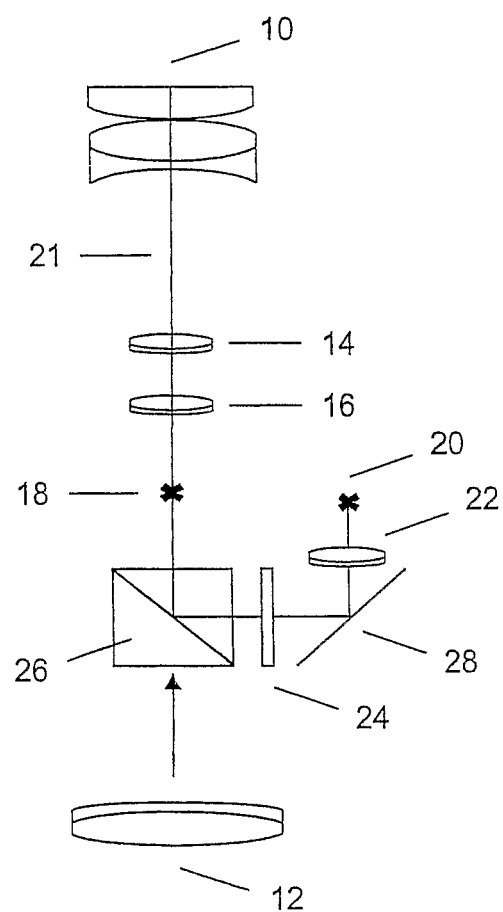
Figure 4:
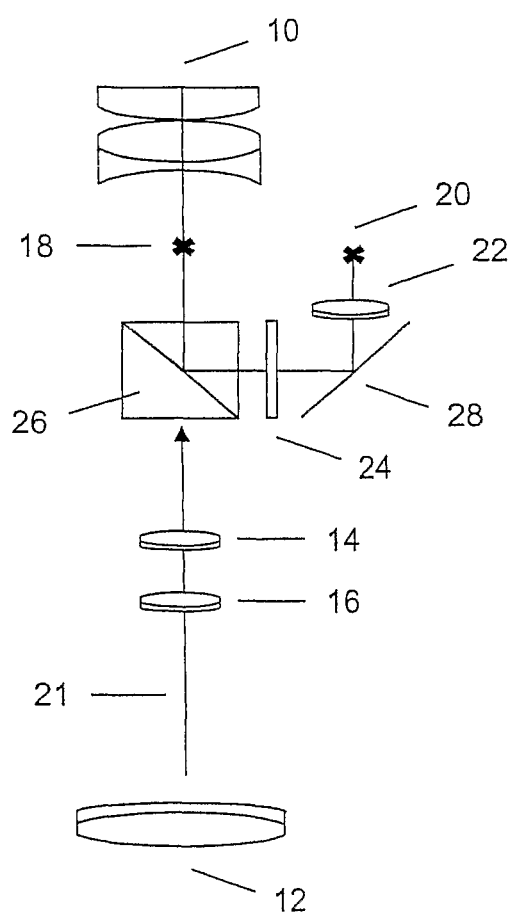

Thus, the following are shown:

FIG. 1 a first embodiment example of a terrestrial telescopic sight according to the invention in a schematic longitudinal view through the optic axis;

FIG. 2 a second embodiment example corresponding to FIG. 1 of a telescopic sight according to the invention;

FIG. 3 a third embodiment example corresponding to FIGS. 1 and 2 of a telescopic sight according to the invention; and FIG. 4 a further embodiment example corresponding to FIGS. 1-3 of a telescopic sight according to the invention.

With the terrestrial telescopic sight shown in FIG. 1, in which an ocular 10 and an objective 12 close, at the forward end, an outer tube, not shown, which runs in FIG. 1 from the top downward, the ocular 10 and the objective 12 in association with a lens system exhibiting lenses 14, 16, define a first image plane on which is disposed an image 18 of a depicted circular graticule. An actual sight graticule 20 is found outside the outer tube, not shown, and the ray path of the target optics defined by the ocular 10, the objective 12, and the lenses 14, 16, and is projected by means of a projection-lens system 22 by a glass window 24, which is dust- and water-proof, onto a beam splitter 26 through a translucent prism system, which produces the image 18 of the sight graticule 20 which is essentially in the center on the first image plane of the telescopic-sight optics. The sight graticule 20, at whose location a storage unit, particularly an electronic type, can be provided for a number of sight graticules, forms together with the projection-lens system 22 a display unit disposed outside the outer tube of the telescopic sight, which can also be detached, for instance, from the telescopic sight.

In the embodiment example in FIG. 2, the image 18 of the sight graticule 20 is projected onto a second image plane of the telescopic-sight optics, while the image 18, as executed above, lies on the first image plane of the target optics in the embodiment example in FIG. 1.

FIG. 3 shows a further embodiment example of the telescopic sight according to the invention, in which the sight graticule 20 is first projected through the projection-lens system 22 onto a mirror 28, from which the further ray path of the sight picture then passes through the glass window 24 and the beam splitter 26 up to the image 18 on the first image plane of the disposed image 18 in the embodiment example of FIG. 3. Instead of the one mirror 28 shown in the drawing, a mirror system can of course also be provided with several mirrors.

The embodiment example of FIG. 4 is distinguished from that of FIG. 3 by the fact that here the image 18 of the sight graticule 20 is projected onto the second image plane.

The features of the invention disclosed in the description provided, in the drawing, and in the claims can, both singly and in any combination, be fundamental for the complexities of the invention in their various embodiments.

The invention claimed is:

1. A telescopic sight for use with a weapon, the telescopic sight comprising:
   an optical lens system integrated in an elongated outer tube that is configured to be attachable to the weapon and that is closed by an (i) ocular at a forward end facing an eye of a marksman when using the weapon with the telescopic sight attached and (ii) an objective at its opposite forward end, and wherein the optical lens system exhibits between the ocular and the objective at least one image plane disposed along an optical ray path between the ocular and the objective corresponding to light rays passing through the objective towards the ocular; and a sight-graticule pattern, visible to the marksman through the ocular when using the telescopic sight, that comprises a virtual image projected onto at least one of the image planes of a sight graticule disposed outside the optical ray path, wherein the telescopic sight does not include a physical graticule disposed along the optical ray path within the elongated outer tube.

2. A telescopic sight according to claim 1, wherein the at least one image plane onto which the virtual image is projected is coupled to a beam splitter, which is configured to be penetrated by light rays passing through the ocular and the objective and on which at least one sight graticule and a display unit exhibiting a projection device from outside of the outer tube, and the virtual image of the sight graticule can be projected.

3. A telescopic sight according to claim 2, wherein the outer tube includes in the ray path between the display unit and the beam splitter a projection opening sealed closed by a transparent, dustproof and waterproof window.

4. A telescopic sight according to claim 2, wherein the beam splitter comprises an optically translucent prism.

5. A telescopic sight according to any one of claims 2 to 4, wherein the display unit comprises a storage unit with a plurality of sight graticules as well as a selection device for selectively projecting at least one of the sight graticules at the beam splitter.

6. A telescopic sight according to claim 5, wherein the selection device and/or the storage unit is/are formed electronically.

7. A telescopic sight according to claim 6, wherein the display unit comprises a variation device for altering the sight picture projected onto the beam splitter.

8. A telescopic sight according to claim 7, wherein the variation device is formed electronically.

9. A telescopic sight according to claim 8, wherein the variation device is configured for zero-point adjustment of the telescopic sight.

10. A telescopic sight according to claim 8, wherein the variation device comprises an electronic computer connected to an electronic sight graticule and a high-resolution graphics module.

11. A telescopic sight according to claim 10, wherein the variation device can be operated by means of a keying device attached to the telescopic sight or to the weapon or by remote control.

12. A telescopic sight according to claim 11, wherein data comprising one or more of ballistics information and ammunition parameters of the bullet to be fired from the weapon can be entered into the variation device by means of a keying device while the weapon is being used for firing by means.

13. A telescopic sight according to claims 10, wherein the variation device is connected to a target range-finder.

14. A telescopic sight according to claims 10, wherein the computer of the variation device is connected to a device for parallax correction found on the telescopic sight.

15. A telescopic sight according to claims 10, wherein the computer of the variation device is connected to an air-pressure meter.

16. A telescopic sight according to claims 10, wherein an angle measuring instrument is connected to the computer of the variation device and is configured to measure, inclination movements of the telescopic sight and to deliver its data to the computer.

17. A telescopic sight according to claim 16, wherein side-tilting movements of the unit consisting of the weapon and telescopic sight can be indicated to the marksman by a display device using the data from the correction device.

18. A telescopic sight according to claim 16, wherein the sight graticule pattern position in relation to the deviation caused by side tilting in the flight path of the bullet can be directly corrected by the computer.

19. A telescopic sight according to claim 10, wherein the sight graticule pattern distinguishable for the marksman in the telescopic sight relative to the target through the computer can be corrected upward or downward by the computer while shooting.

20. A telescopic sight for use with a weapon, the telescopic sight comprising:

an optical lens system integrated in an elongated outer tube that is configured to be attachable to the weapon and that is closed by (i) an ocular at a forward end facing an eye of a marksman when using the weapon with the telescopic sight attached and (ii) an objective at its opposite forward end, and wherein the optical lens system exhibits between the ocular and the objective at least one image plane disposed along an optical ray path between the ocular and the objective corresponding to light rays passing through the objective towards the ocular; and a sight-graticule pattern, visible to the marksman through the ocular when using the telescopic sight, that consists of a virtual image projected onto at least one of the image planes of a sight graticule disposed outside the optical ray path;

at least one beam splitter associated with the at least one image plane onto which the virtual image is projected, wherein the at least one beam splitter is configured to be penetrated by light rays passing through the ocular and the objective and on which the virtual image of the sight graticule can be projected from outside of the outer tube by a display unit comprising a projection device and at least one sight graticule, wherein the display unit comprises (i) a storage unit configured to store a plurality of sight graticules and (ii) a selection device operable for selectively projecting at least one of the sight graticules onto the at least one beam splitters; and wherein:
(i) the selection device and/or the storage unit is/are formed electronically;
(ii) the display unit comprises a variation device for altering the graticule virtual image projected onto the at least one beam splitter, said variation device being configured to provide for zero-point adjustment of the telescopic sight;
(iii) the variation device comprises an electronic computer connected to an electronic storage device for graticules and a high-resolution graphics module, wherein the variation device can be operated by using a keying device attached to the telescopic sight and/or to the weapon or by using a remote control, and
(iv) the shape and color of the sight graticule can be designed and executed by the marksman according to his individual desires.

* * * * *